US012500377B2

(12) United States Patent
Mizumura

(10) Patent No.: US 12,500,377 B2
(45) Date of Patent: Dec. 16, 2025

(54) ULTRA HIGH SPEED SIGNAL CABLE CONNECTOR HAVING CHARACTERISTICS OF COMPACT IN STRUCTURE, SMALL IN OCCUPIED SPACE, CONVENIENT TO WELD AND HIGH IN TRANSMISSION EFFICIENCY

(71) Applicant: Samtec, Inc., New Albany, IN (US)

(72) Inventor: Akinori Mizumura, Yokohama (JP)

(73) Assignee: SAMTEC, INC., New Albany, IN (US)

( * ) Notice: Subject to any disclaimer, the term of this patent is extended or adjusted under 35 U.S.C. 154(b) by 360 days.

(21) Appl. No.: 18/013,971

(22) PCT Filed: Aug. 4, 2021

(86) PCT No.: PCT/US2021/044481
§ 371 (c)(1),
(2) Date: Dec. 30, 2022

(87) PCT Pub. No.: WO2022/035654
PCT Pub. Date: Feb. 17, 2022

(65) Prior Publication Data
US 2023/0299538 A1 Sep. 21, 2023

Related U.S. Application Data

(60) Provisional application No. 63/064,020, filed on Aug. 11, 2020.

(51) Int. Cl.
*H01R 13/627* (2006.01)
*H01R 12/72* (2011.01)
*H01R 13/58* (2006.01)

(52) U.S. Cl.
CPC ....... *H01R 13/6272* (2013.01); *H01R 12/721* (2013.01); *H01R 13/5804* (2013.01)

(58) Field of Classification Search
CPC ............ H01R 13/6272; H01R 13/5804; H01R 12/721
(Continued)

(56) References Cited

U.S. PATENT DOCUMENTS 6,402,552 B1 6/2002 Wagner
7,666,023 B2 * 2/2010 Wu .................... H01R 13/6275 439/352
(Continued)

FOREIGN PATENT DOCUMENTS

CN 106450945 A * 2/2017 ............. H01R 12/71
CN 207651703 U * 7/2018
(Continued)

OTHER PUBLICATIONS

Office Action in TW110129092, mailed May 16, 2022, 13 pages.
(Continued)

*Primary Examiner* — Peter G Leigh
(74) *Attorney, Agent, or Firm* — Keating & Bennett, LLP

(57) ABSTRACT

A cable connector includes a cable including a center conductor, a first housing, and an overmold attached to the cable and the first housing. The cable connector can include a second housing and the overmold can be attached to the second housing. Alternatively, a cable connector system includes a cable connector including a first latch, and a board connector including a second latch and a shield, wherein the shield is staked to a substrate, and a body of the cable connector includes an outer wall that extends over the shield when the cable connector is mated to the board connector.

8 Claims, 9 Drawing Sheets

(58) Field of Classification Search
USPC .......................................................... 439/471
See application file for complete search history.

(56) References Cited

U.S. PATENT DOCUMENTS

| | | | | |
|---|---|---|---|---|
| 8,475,197 | B2 * | 7/2013 | Zerebilov | H01R 13/6275 439/352 |
| 8,932,085 | B2 | 1/2015 | Fang et al. | |
| 9,231,393 | B2 | 1/2016 | Buck et al. | |
| 10,038,280 | B2 * | 7/2018 | Schaefer | H01R 13/639 |
| 10,461,473 | B1 * | 10/2019 | Hsiao | H01R 13/6335 |
| 11,381,015 | B2 | 7/2022 | Lu | |
| 2005/0048809 | A1 | 3/2005 | Bolen et al. | |
| 2009/0258525 | A1 | 10/2009 | Gabrielsson | |
| 2011/0197439 | A1 * | 8/2011 | Hirano | H01R 13/6275 29/874 |
| 2014/0038447 | A1 * | 2/2014 | Brown | H01R 13/62 439/350 |
| 2015/0056859 | A1 | 2/2015 | Higuchi et al. | |
| 2017/0222365 | A1 * | 8/2017 | Schaefer | H01R 43/26 |
| 2018/0019554 | A1 | 1/2018 | Yang et al. | |
| 2020/0006898 | A1 * | 1/2020 | Yang | H01R 13/6471 |
| 2020/0076123 | A1 * | 3/2020 | Yang | H01R 13/506 |
| 2020/0366019 | A1 | 11/2020 | Hsiao et al. | |
| 2023/0261419 | A1 * | 8/2023 | Chen | H01R 13/6272 439/352 |

FOREIGN PATENT DOCUMENTS

| | | | | | |
|---|---|---|---|---|---|
| CN | 208608427 | U | * | 3/2019 | H01R 13/502 |
| CN | 208797273 | U | * | 4/2019 | |
| CN | 209249735 | U | * | 8/2019 | |
| JP | 2007503694 | A | | 2/2007 | |
| JP | 4429354 | B2 | * | 3/2010 | H01R 13/6275 |
| TW | M397638 | U | * | 2/2011 | H01R 12/724 |
| TW | M584028 | U | * | 9/2019 | H01R 12/62 |
| TW | M584035 | U | * | 9/2019 | H01R 12/57 |
| TW | M593098 | U | * | 4/2020 | H01R 12/53 |
| TW | M596468 | U | * | 6/2020 | H01R 13/6335 |
| TW | M597991 | U | | 7/2020 | |

OTHER PUBLICATIONS

Office Action in TW110129092, mailed Sep. 8, 2022, 15 pages.
Official Communication issued in International Patent Application No. PCT/US2021/044481, mailed on Nov. 25, 2021.

* cited by examiner

ULTRA HIGH SPEED SIGNAL CABLE CONNECTOR HAVING CHARACTERISTICS OF COMPACT IN STRUCTURE, SMALL IN OCCUPIED SPACE, CONVENIENT TO WELD AND HIGH IN TRANSMISSION EFFICIENCY

BACKGROUND OF THE INVENTION

1. Field of the Invention

The present invention relates to a high-speed connector system. More specifically, the present invention relates to a high-speed connector with strain reliefs.

2. Description of the Related Art

Cable connector systems that connect cables to a printed circuit board (PCB) are known. Cable connector systems of the related art include a board-mounted connector such as those shown in FIGS. 2 and 4 and a cable connector such as those shown in FIGS. 1 and 3. The boards connectors are mounted to a PCB, and the cable connectors plug in to connect to the board connectors.

FIGS. 1 and 2 show a cable connector system of the related art. FIG. 1 shows a cable connector 10 that includes a body 12, cables 14 attached to contacts (not visible) within the body 12, and a latch 16 used to engage with a mating latch 26 of the board connector 20 and to lock the cable connector 10 to the board connector 20. FIG. 2 shows that the board connector 20 includes a body 22 that is to be mounted to a PCB, contacts 24 that mate with corresponding contacts in the cable connector 10, and the mating latch 26.

During insertion of the cable connector 10 into the board connector 20, the mating latch 26 is aligned and fits into a slot in the latch 16 such that tabs (not shown in FIG. 1) on the inside of the latch 16 engage an opening 28 in the matching latch 26 and a curled flange 18 of the latch 16 fits over a bottom portion of the mating latch 26. Accordingly, the latching mechanism defined by latches 16, 26 locks the cable connector 10 and the board connector 20 together to ensure engagement of the cable connector 10 and the board connector 20 and to secure the cable connector 10 and the board connector 20 against inadvertent dis-engagement.

FIGS. 3 and 4 show a different type of cable connector system of the related art. FIG. 3 shows a cable connector 30 that includes a body 32, cables 34 attached to an edge card 31, and a latch 36 used to engage with a mating latch 46 of a board connector 40 and to lock the cable connector 30 to the board connector 40. FIG. 4 shows that the board connector 40 includes a body 42 that is to be mounted to a PCB, contacts 44 that mate with corresponding pads on the edge card 31 of the cable connector 30, and the mating latch 46.

During insertion of the cable connector 30 into the board connector 40, the latch 36 is aligned and fits into a slot in the latch 46 such that the tabs 38 on the latch 36 engage openings 48 in the latch 46. Accordingly, the latching mechanism defined by the latches 36, 46 locks the cable connector 30 and the board connector 40 together to ensure engagement of the cable connector 30 and the board connector 40 and to secure the cable connector 30 and the board connector 40 against inadvertent dis-engagement.

However, the cable connection systems described above have inherent problems caused by external forces created by cable tension and/or environmental factors such as shock and vibration. First, it is possible for an internal contact in the cable connector to disengage from the cable connector body, a cable to disengage from a contact, or a cable to break at a point near where the cable exits the cable connector body. In addition, if one of these possibilities occurs, then it is possible that the latching mechanism can become unlocked.

For example, FIG. 5 shows a cross section view of a cable connector 50 and a board connector 55 of the related art mated to each other. The board connector 55 is mounted to a PCB 59. If cable tension or external forces cause the cable connector 50 to rotate in a clockwise direction with respect to the board connector 55, the cable connector 50 can pivot about point P and cause a shield in the board connector 55 to deform, separating the cable-connector latch 56 and the board-connector latch 57 such that the tabs of the cable-connector latch 56 are forced out of the openings in the board-connector latch 57. Accordingly, the latching mechanism defined by the latches 56, 57 can become unlocked. Once unlocked, continued external forces can cause the contacts of the board connector 56 to disengage from the pads on the edge card of the cable connector 50, resulting in intermittent or complete loss of signal continuity.

SUMMARY OF THE INVENTION

To overcome the problems described above, preferred embodiments of the present invention provide cable connector systems with strain reliefs to retain cables within a cable connector and extended outer walls to prevent unlocking and disengagement of the cable connectors and board connectors.

According to a preferred embodiment of the present invention, a cable connector includes a cable including a center conductor; a first housing; and an overmold attached to the cable and the first housing.

The overmold can be in a first slot in the first housing. The cable connector can further include a second housing. The overmold can be in a second slot in the second housing. The overmold can extend between the first housing and the second housing. A perimeter of the overmold can be contained within the first housing and the second housing.

The cable connector can further include an additional cable and a spacer between the cable and the additional cable. The overmold can extend between the first housing, the cable, the additional cable, the spacer, and the second housing.

The overmold can be made of a dielectric material, can include conductive particles, or can include a non-conductive magnetically absorbing material.

The center conductor can be exposed at an end of the cable, and the cable can include a bent portion between the end of the cable and the overmold.

According to a preferred embodiment of the present invention, a cable connector system includes a cable connector including a first latch; and a board connector including a second latch and a shield; wherein the shield is staked to a substrate, and a body of the cable connector includes an outer wall that extends over the shield when the cable connector is mated to the board connector.

The first latch can be spring loaded. The shield can be on one wall of the board connector. The shield can be on at least two walls of the board connector. The shield can be on at least three walls of the board connector.

According to a preferred embodiment of the present invention, a connector includes a housing with a mating surface and an outer wall that extends from the housing beyond the mating surface.

The outer wall can extend from only one side of the housing. The outer wall can extend from the mating surface.

The outer wall can be on a same side of the housing as a latch. The outer wall can be plastic.

The connector can further include a printed circuit board. The printed circuit board can extend farther from the mating surface than the outer wall. The cable connector can further include an additional outer wall that extends from a same side of the housing as the outer wall. The cable connector can further include a latch between the outer wall and the additional outer wall. The cable connector can mate with a card edge connector. The outer wall can extend adjacent to an external surface of the board connector.

According to a preferred embodiment of the present invention, a method of manufacturing a cable connector includes providing a first cable including a center conductor, inserting the first cable into a housing, and overmolding a portion of the first cable and a portion of the housing to define an overmold.

The method can further include providing a second cable and inserting the second cable into the housing, and the overmolding step can include overmolding a portion of the second cable.

A spacer can be provided between the first cable and the second cable.

The method can further include inserting an edge card into the housing prior to the overmolding step.

The method can further include terminating a portion of the center conductor of the first cable to the edge card.

The first cable can include a bent portion between the portion of the center conductor terminated to the edge card and the portion of the first cable overmolded by the overmold.

The overmolding step can include an injection molding process. In the injection molding process, the overmold can be applied through slots in the connector body and can flow into a void space in the housing. The overmold can be made of a dielectric material, can include conductive particles, and can include a non-conductive magnetically absorbing material.

The first cable can include a shield and an insulating layer, and the overmold material can flow only around the insulating layer of the first cable and not on or around the center conductor or the shield of the first cable.

According to a preferred embodiment of the present invention, a method of manufacturing a cable connector includes providing a housing that includes contacts and an electrical cable and injection molding a strain relief overmold into the housing.

The method can further include a step of constraining the strain relief overmold to only an internal void of housing.

The method can further include a step of constraining at least 75 percent of the strain relief overmold to an internal void of housing.

The method can further include a step of completely surrounding a respective outer insulating layer portion of at least two separate, spaced apart cables.

The method can further include a step of preventing the contacts from physically touching the strain relief overmold.

According to a preferred embodiment of the present invention, an electrical connector includes a housing that defines an outer wall and a mating face. The outer wall extends beyond the mating face, and the electrical connector mates in a mating direction that is perpendicular or substantially perpendicular to a host substrate that carries a mating electrical connector.

The outer wall can be only positioned on one side of the housing, and the electrical connector can be devoid of other outer walls on other sides of the housing that extend beyond the mating face. The electrical connector can further include an edge card. The electrical connector can further include cables. The electrical connector can further include a latch. The electrical connector can further include a latch positioned on the one side of the housing. The electrical connector can further include a strain relief overmold only located within the housing.

The above and other features, elements, characteristics, steps, and advantages of the present invention will become more apparent from the following detailed description of preferred embodiments of the present invention with reference to the attached drawings.

DETAILED DESCRIPTION OF PREFERRED EMBODIMENTS

Figure 1:
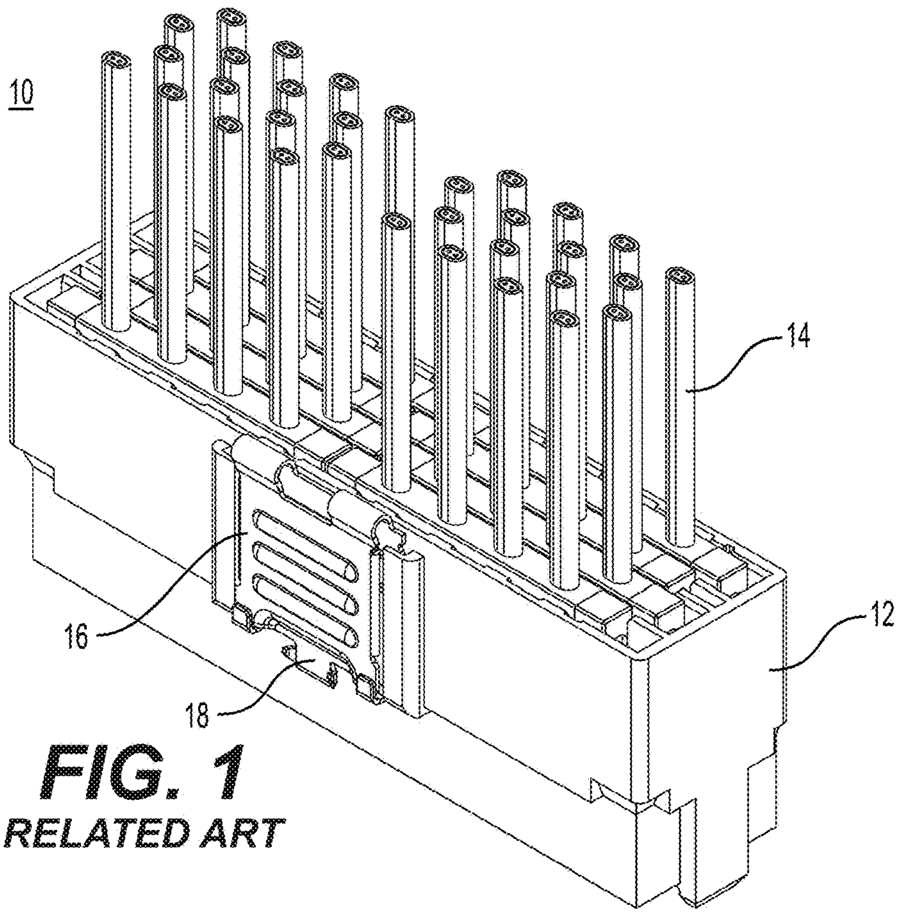
FIG. 1 RELATED ART
FIGS. 1 and 2 show a cable connector system of the related art.
Figure 2:
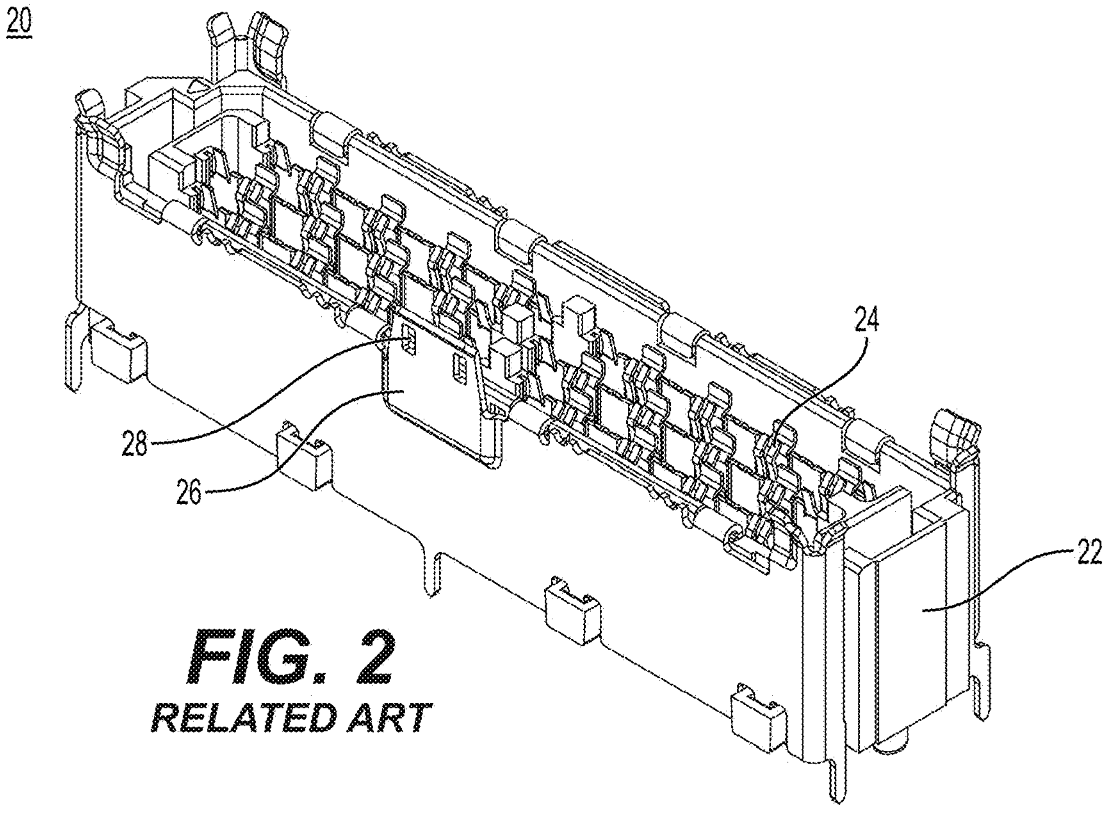
FIG. 2 RELATED ART
Figure 3:
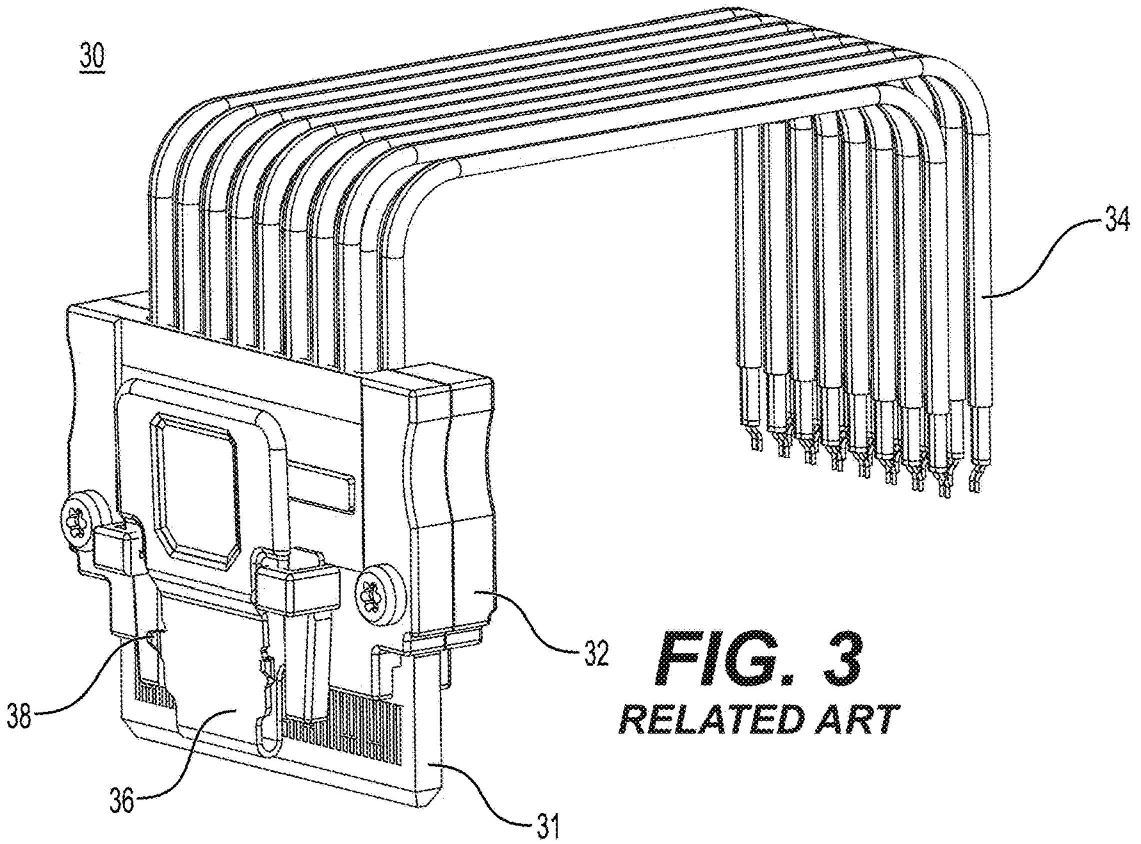
FIG. 3 RELATED ART
FIGS. 3 and 4 show a different cable connector system of the related art.
Figure 4:
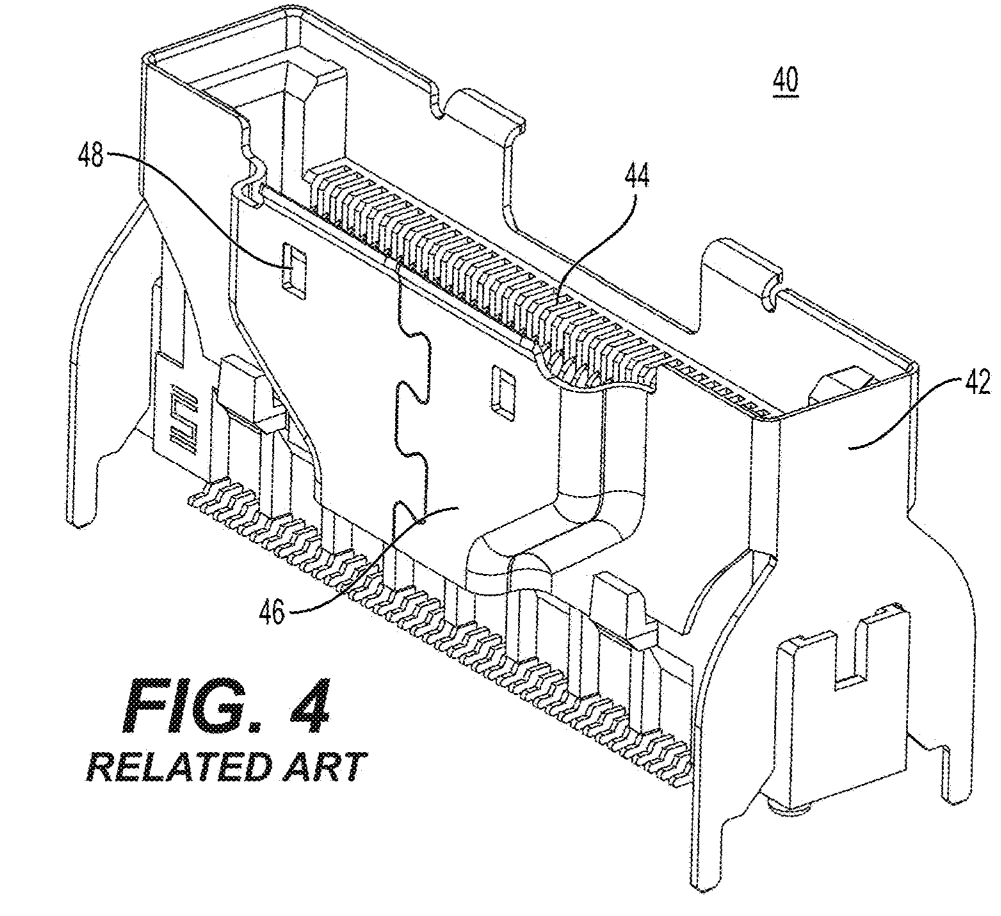
FIG. 4 RELATED ART
Figure 5:
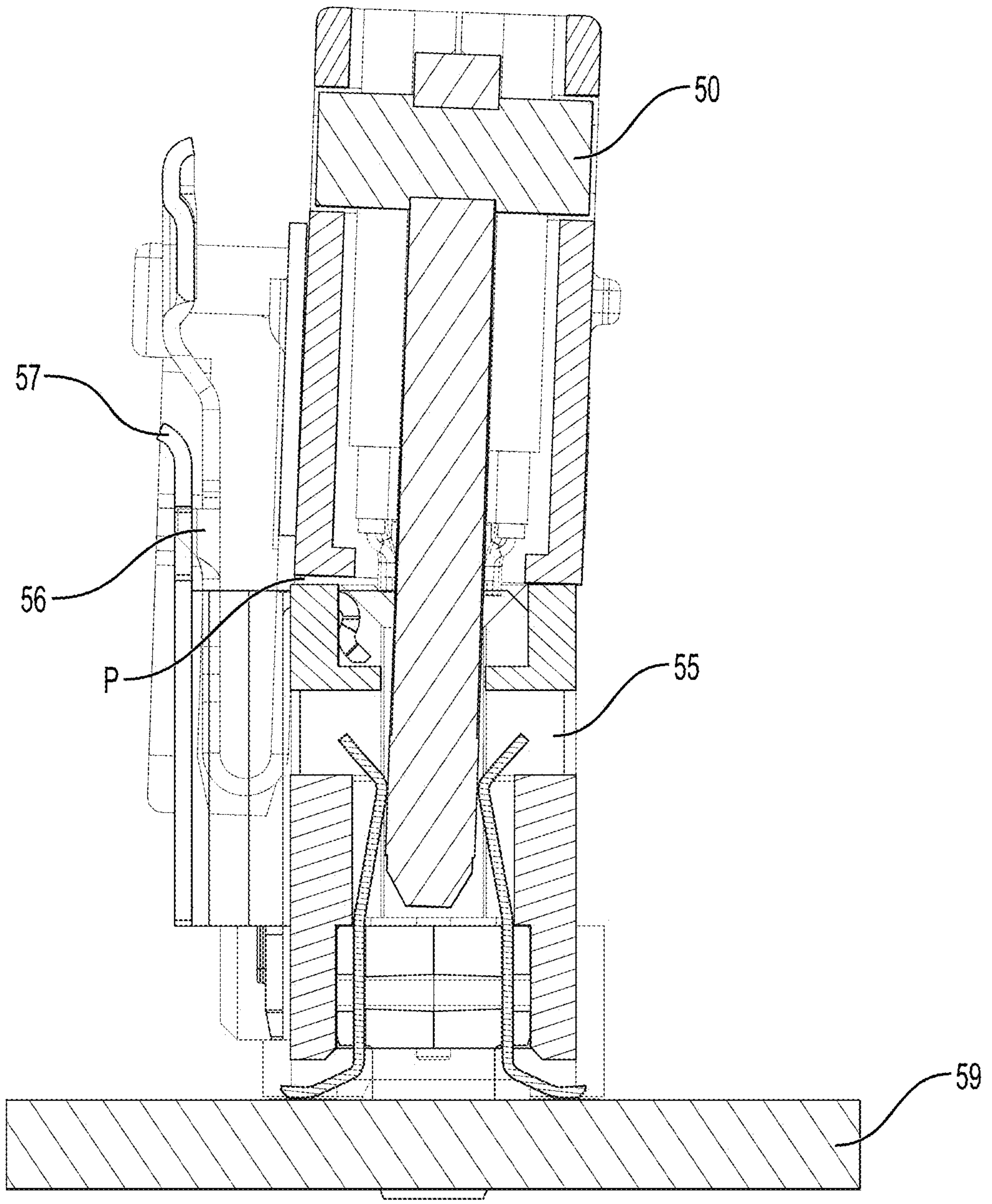
FIG. 5 RELATED ART
FIG. 5 shows a mated connector system of the related art.
Figure 6:
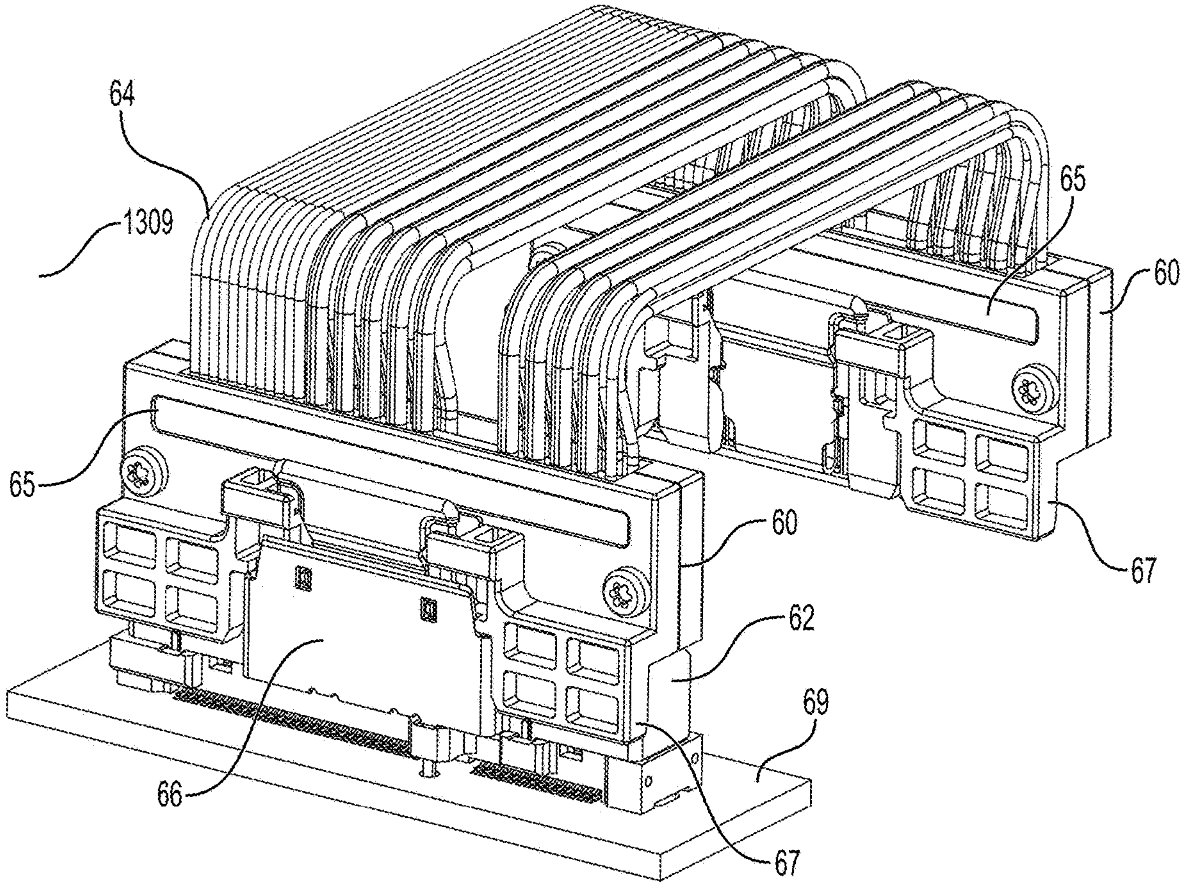
FIG. 6 shows a cable connector system with strain reliefs.

Generally, with reference to FIG. 6, disclosed herein is an electrical connector, with cables 64, such as cable connector 60, or without cables. An electrical connector without cables 64 can be a mezzanine, vertical, right angle or co-planar connector. The electrical connector can include a first housing that defines an outer wall 67. The outer wall 67 can inhibit the first housing, the electrical connector, or the electrical cable connector 60 from pivoting in at least one direction when the first housing, the electrical connector, or the electrical cable connector 60 is mated to a mating electrical connector, such as board connector 62 that can include a second housing.

FIG. 6 shows a cable connector system that includes two cable connectors 60, a board connector 62 mounted to a substrate 69, and cables 64 attached between the two cable connectors 60. The substrate 69 can be any suitable substrate, including, for example, a PCB. The cable connectors 60 can be vertical or straight cable connectors in which the cables 64 exit the body of the cable connectors 60 parallel or substantially parallel within manufacturing tolerances to a mating direction of the cable connector 60 with the board connector 62 and perpendicular or substantially perpendicular within manufacturing tolerances to a major surface of the substrate 69 when the cable connectors 60 are mated to the board connector 62. One of the cable connectors 60 is mated and connected to the board connector 62, and the other cable connector 60 is flying and can be mated to another board connector 62 (not shown). A locking mechanism 66 can be used to lock the cable connector 60 to the board connector 62, as described with respect to the related art. The cables 64 can be all the same or a mix of different types of cables and can include solid wires, multi-strand wires, co-axial cables, twin-axial cables, and the like. The cables 64 can transmit power, control signals, high-speed and/or low-speed signals, and the like.

Unlike the cable connectors discussed with respect to the related art, each of the cable connectors 60 can include a cable strain relief 65 in a slot of the connector body and an outer wall 67 extending from the body of the cable connectors 60 and aligned with a side of the body of the board connector 62.

Figure 7:
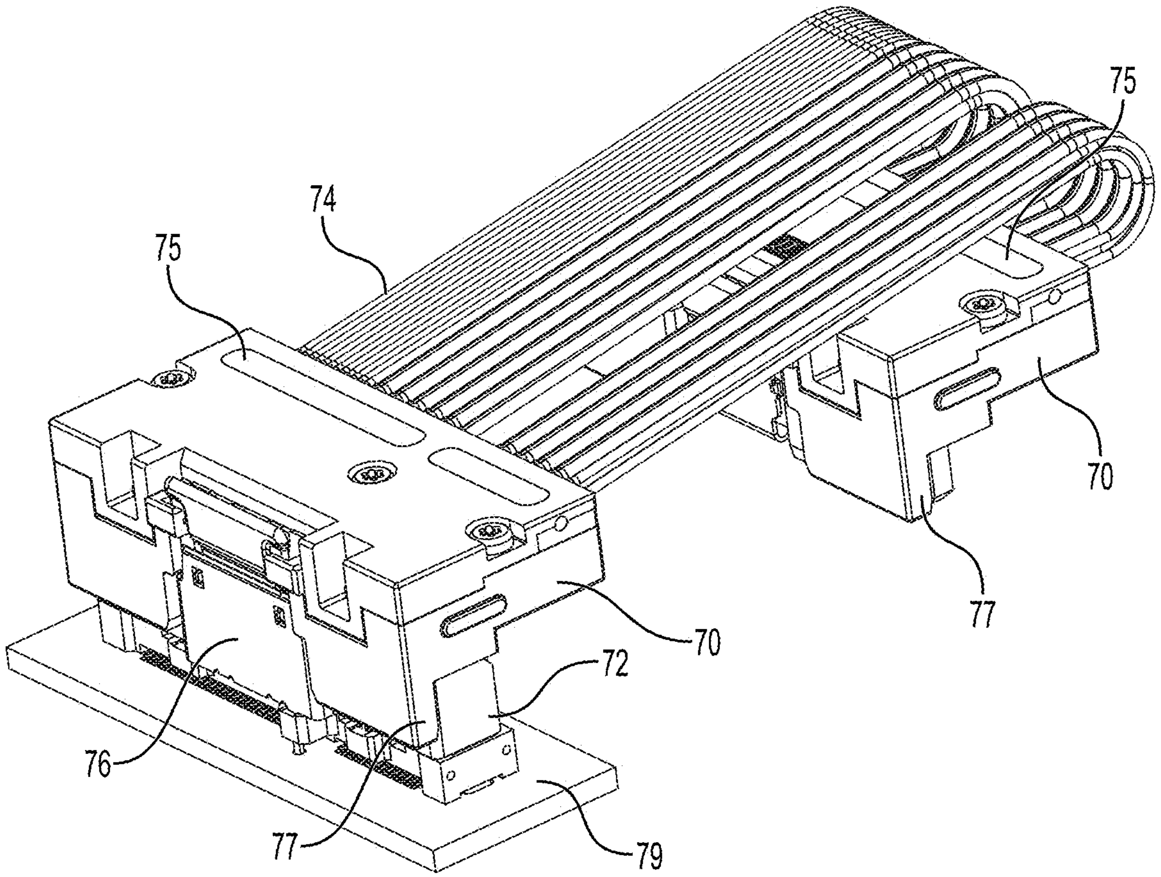
FIG. 7 shows another cable connector system with strain reliefs.

Similar to FIG. 6, FIG. 7 shows a cable connector system that includes two cable connectors 70, a board connector 72 mounted to a substrate 79, and cables 74 attached between the two cable connectors 70. The substrate 79 can be any suitable substrate, including, for example, a PCB. However, unlike the cable connectors 60 shown in FIG. 6, the cable connector in FIG. 7 are right-angle connectors rather than vertical straight connectors. That is, the cables 74 exit the body of the cable connector 70 at a right-angle or a substantial right angle within manufacturing tolerances with the direction in which the cable connector 70 mates with the board connector 72. One of the cable connectors 70 is mated to the board connector 72, and the other cable connector 70 is flying and can be mated to another board connector 72 (not shown). A locking mechanism 76 can be used to lock the cable connector 70 to the board connector 72 as described with respect to the related art. The cables 74 can be all the same or a mix of different types of cables and can include solid wires, multi-strand wires, co-axial cables, twin-axial cable, and the like. The cables 64 can transmit power, control signals, high-speed and/or low-speed signals, and the like.

Unlike the cable connectors of the related art, each of the cable connectors 70 can include a cable strain relief 75 and an outer wall 77 extending from the body of the connector and aligned with a side of the body of the board connector 72.

Figure 8:
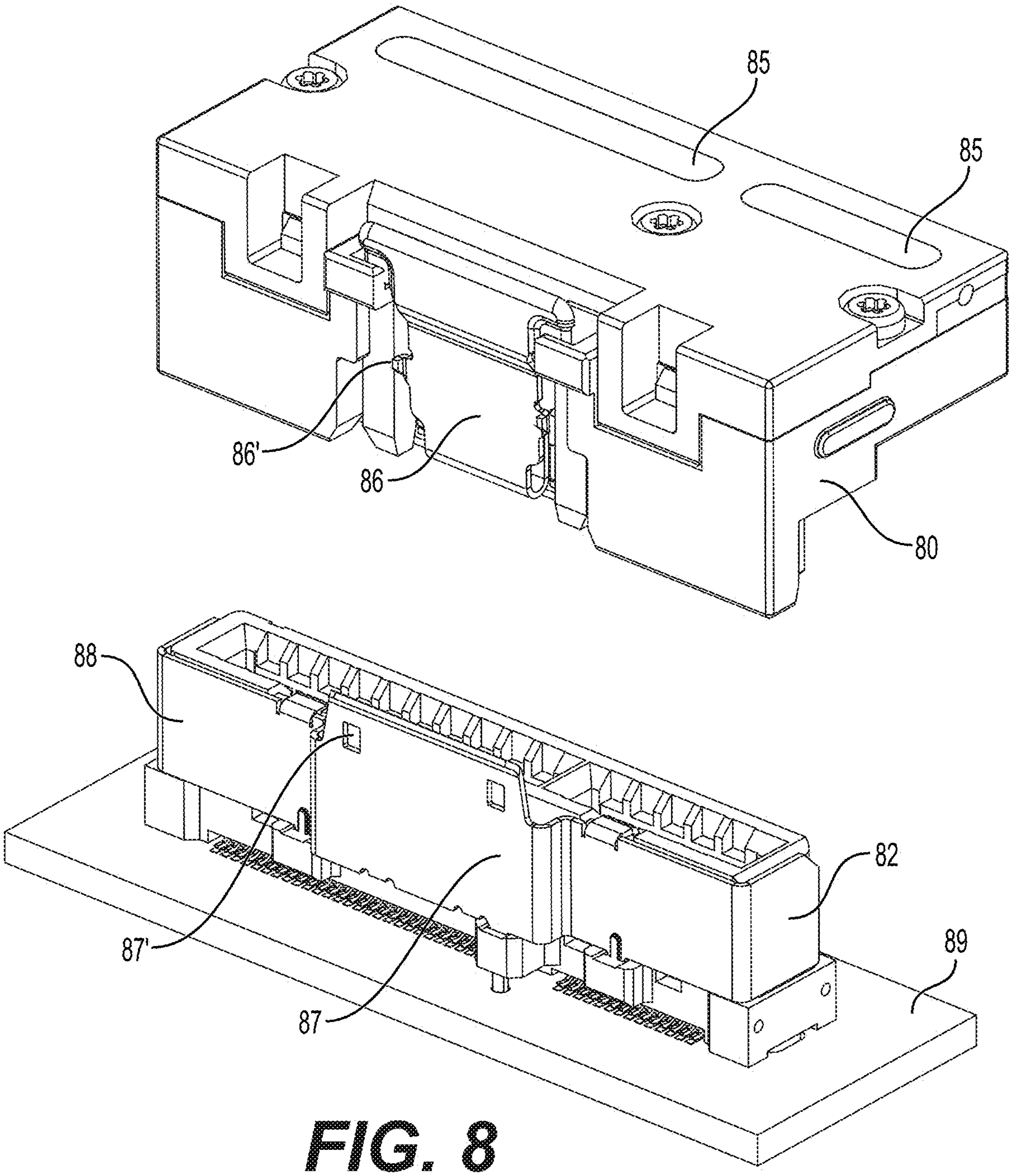
FIG. 8 shows a right-angle cable connector and a board connector unmated from each other.

FIG. 8 shows a right-angle connector 80 and a board connector 82 similar to the cable connectors 70 and the board connector 72 shown in FIG. 7, but unmated from each other. In FIG. 8, the board connector 82 is mounted onto a substrate 89 and the latching mechanism includes a male latch 86 of the cable connector 80 and a female latch 87 of the board connector 82. The board connector 82 can also include a shield 88 that includes the female latch 87 and wraps around the body of the board connector 82 to minimize electromagnetic interference (EMI) at the cable connections. The shield 88 can be on located on one wall, two walls, three walls, or four walls of the body of the board connector 82. The male latch 86 can be spring loaded so that spring tension can be used to assist in holding the tabs 861 of the male latch 86 into openings 871 of the female latch 87.

Figure 9:
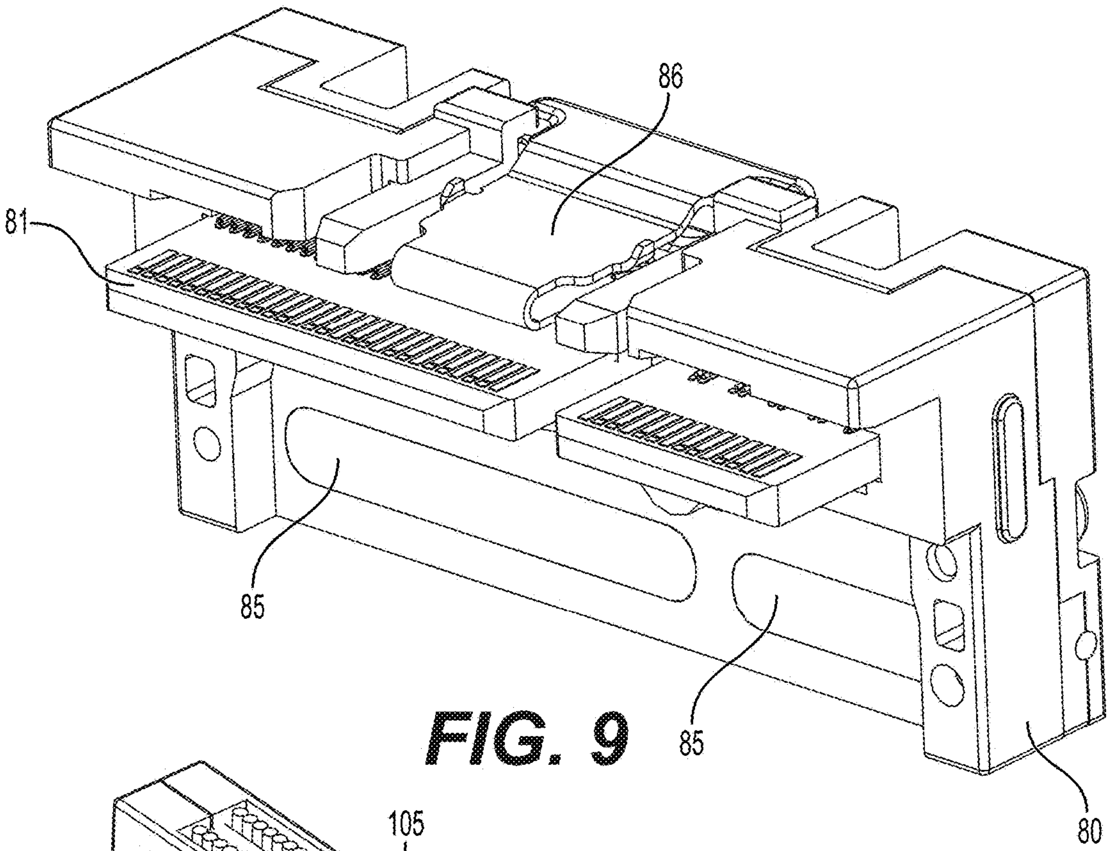
FIG. 9 shows the bottom of the right-angle cable connector of FIG. 8.

The cable connector 80 can include a cable strain relief 85. FIG. 9 is a view of the underside of the cable connector 80 shown in FIG. 8, and FIG. 9 shows the cable strain relief 85. The cable connector 80 can include an edge card 81 connection scheme that is located in a slot in the body of the board connector 82. The cables of the cable connector 80 can be terminated to the edge card 81 by, for example, soldering center conductors of the cables to pads on the edge card 81.

Figure 10:
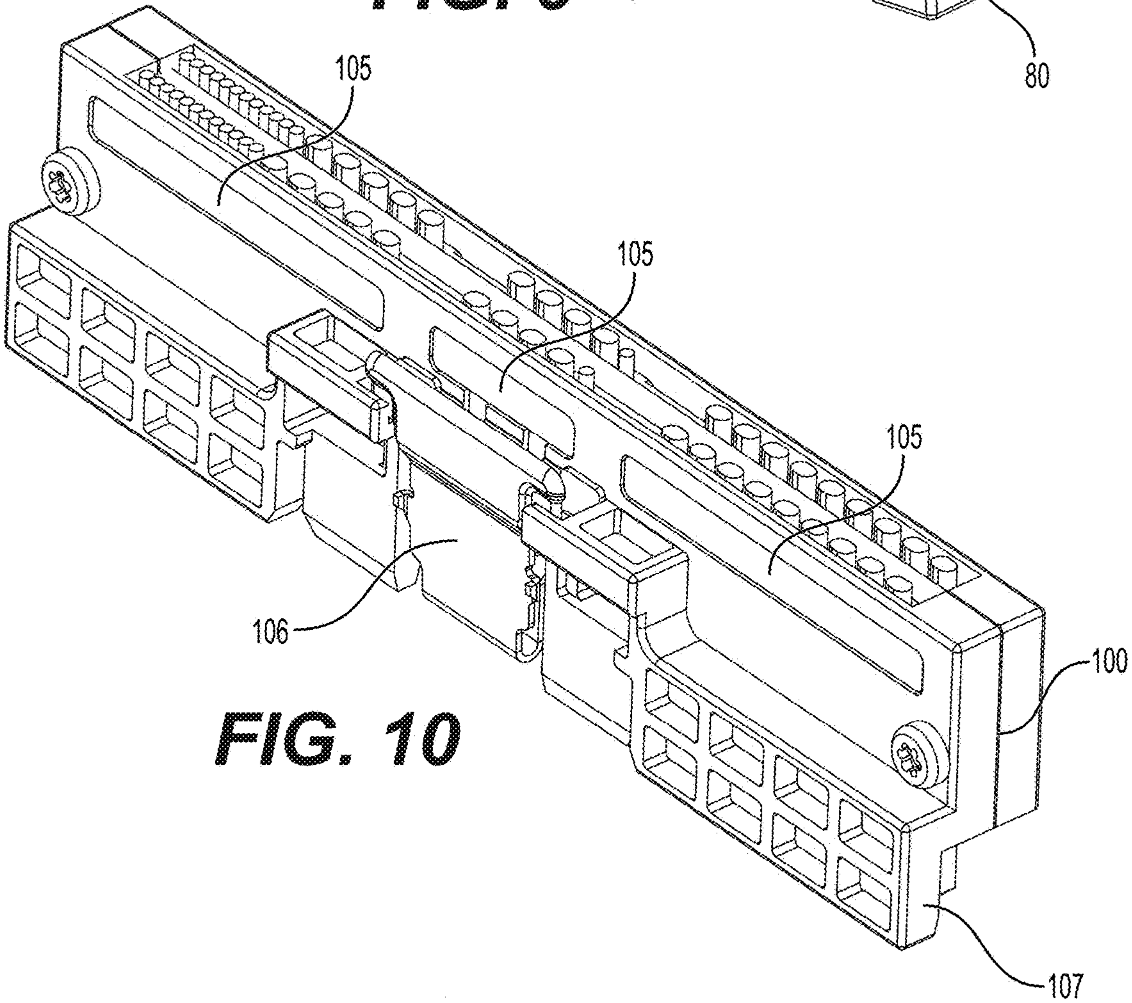
FIG. 10 shows a vertical cable connector.

FIG. 10 shows a vertical or straight cable connector 100 similar to the cable connectors 60 shown in FIG. 6 but expanded to include more cable connections and includes an extended outer wall 107, a latch 106, and cable strain reliefs 105. Any suitable number of cable connections are possible with the vertical or straight cable connector 100.

Figure 11:
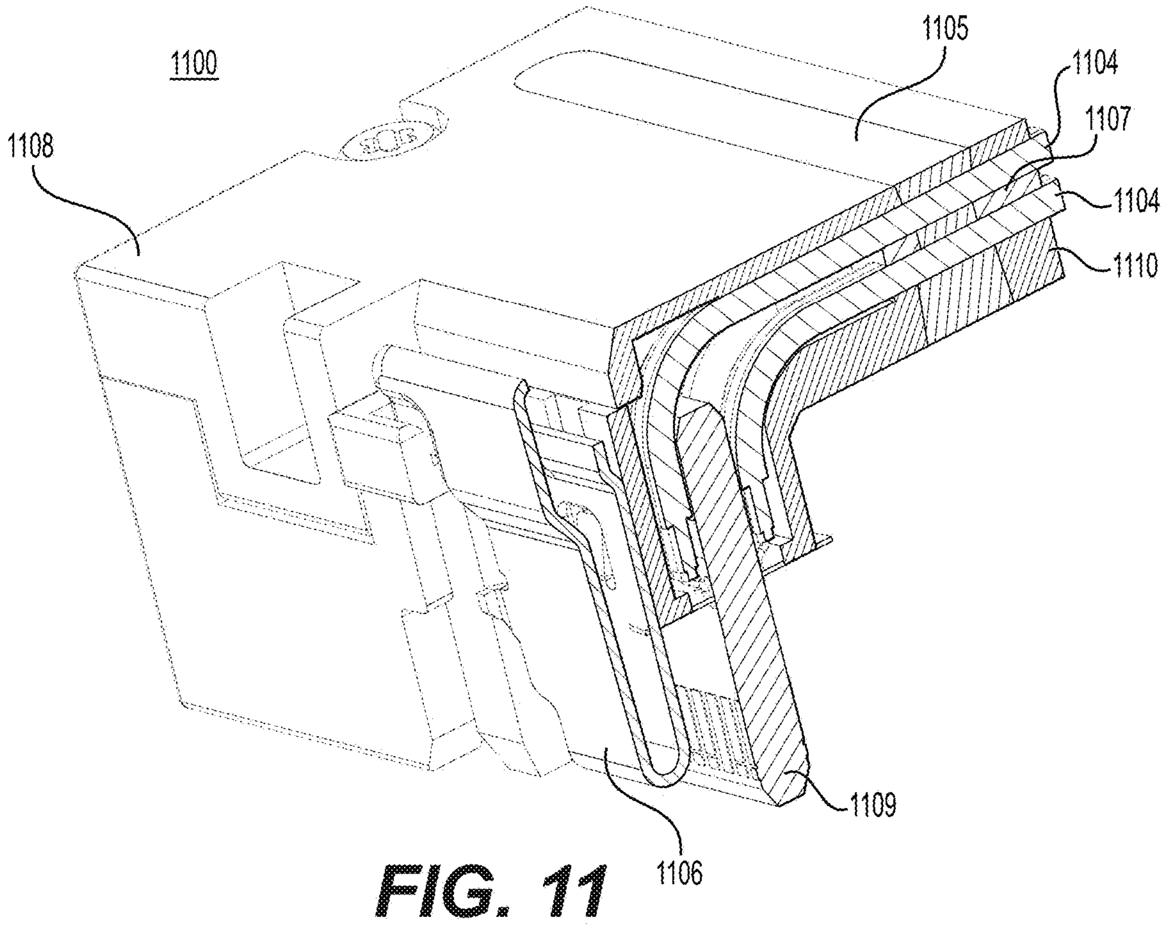
FIG. 11 shows a side cross-sectional view of a right-angle cable connector.

FIG. 11 is a side cross-sectional view of a right-angle cable connector 1100 similar to the cable connectors 70 shown in FIG. 7 and the right-angle connector 80 shown in FIG. 8. Portions of the cable connector 1100 are cut away in FIG. 11 to expose interior features including the cable strain relief 1105, the latch 1106, and the edge card 1109. The cable strain relief 1105 can be an overmold applied with a low-pressure low-velocity injection molding through slots in the connector body that flows into a void in the cable connector 1100 and that is then cured to harden. Before the cable strain relief 1105 is injection molded, the two rows of cables 1104 are terminated to the edge card 1109 and the top cap 1108 and bottom cap 1110 are connected with the cable spacer 1107 between the two rows of cables 1104. The strain reliefs of the cable connectors discussed above can be similarly implemented.

Material used to create the overmold cable strain relief 1105 can be a dielectric, for example, glass-filed nylon, liquid crystal polymer (LCP), plastic, epoxy, glue, resin, silicone, and the like. Alternatively, the overmold material can be an electrically conductive material to provide shielding to minimize EMI or unwanted resonants, for example, an electrically conductive plastic. The electrically conductive plastic may include one of the dielectric materials described above embedded with conductive particles. Alternatively, the overmold material can be a non-conductive magnetically absorbing material (for example, ferrite). In general, the overmold material can be any material that can flow and cure and is suitable for the application.

The cable strain relief 1105 can be provided within the cable connector 1100 and can engage up to five layers of components, including a top cap 1108, two rows of cables 1104, a cable spacer 1107 between the two rows of cables 1104, and a bottom cap 1110 to ensure cable retention, minimize relative movement between the connector components in this area, and provide relief from mechanical strains and forces to the cables 1104. The cable strain relief 1105 can extend only around the cables 1104 away from where the cables 1104 are terminated to the edge card 1109 such that the overmold material flows only around the jackets of the cables and not on or around the center conductors or shields of the cables 1104. That is, the cable strain relief 1105 can be prevented from directly contacting the center conductors of the cables 1104 and from directly contacting electrically conductive portions of the edge card 1109, for example, the contacts of the edge card 1109. The top cap 1108, the bottom cap 1110, and the strain relief 1105 can all be made by injection molding. The perimeter of the strain relief 1105 can be included within the housing, including the top cap 1108 and the bottom cap 1110, of the cable connector 1100. The strain relief 1105 can extend between the top cap 1108 and the bottom cap 1110. In some applications, one or more of the strain relief 1105, the top cap 1108, and the bottom cap 1110 can include a lossy material, either electrically or magnetically lossy material. The strain relief 1105 can be constrained to being only provided in an internal void of the cable connector 1100. However, the strain relief 1105 can also be partially provided outside of the internal void of the cable connector 1100, for example, with at least about 75 percent of the strain relief 1105 being provided in the internal void of the cable connector 1100.

Figure 12:
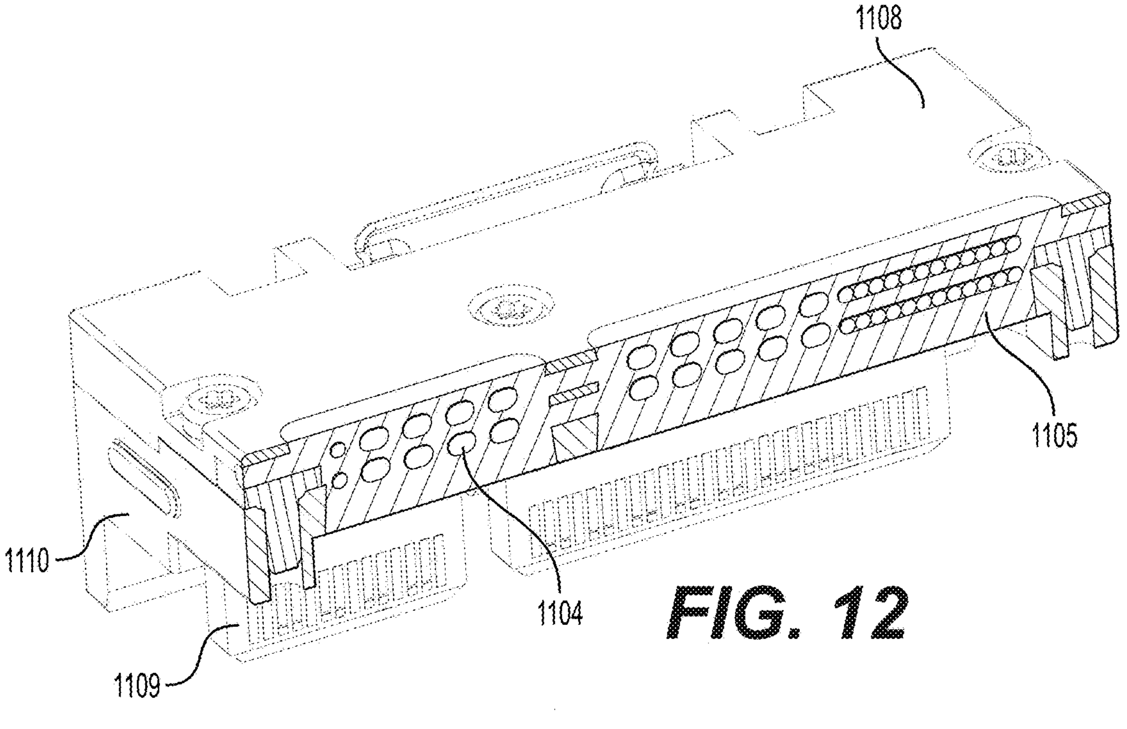
FIG. 12 shows a rear cross-sectional view of a right-angle cable connector.

FIG. 12 is a rear cross-sectional view of the right-angle cable connector 1100 sectioned through the cable strain relief 1105. FIG. 12 shows that the cable strain relief 1105 is contiguous between the top surface of the top cap 1108 and the bottom surface of the bottom cap 1110 and covers the entire outer circumference of an insulation portion of each of the cables 1104. Although FIG. 12 shows that the strain relief 1105 as a single piece, the strain relief 1105 may include multiple pieces.

Figure 13:
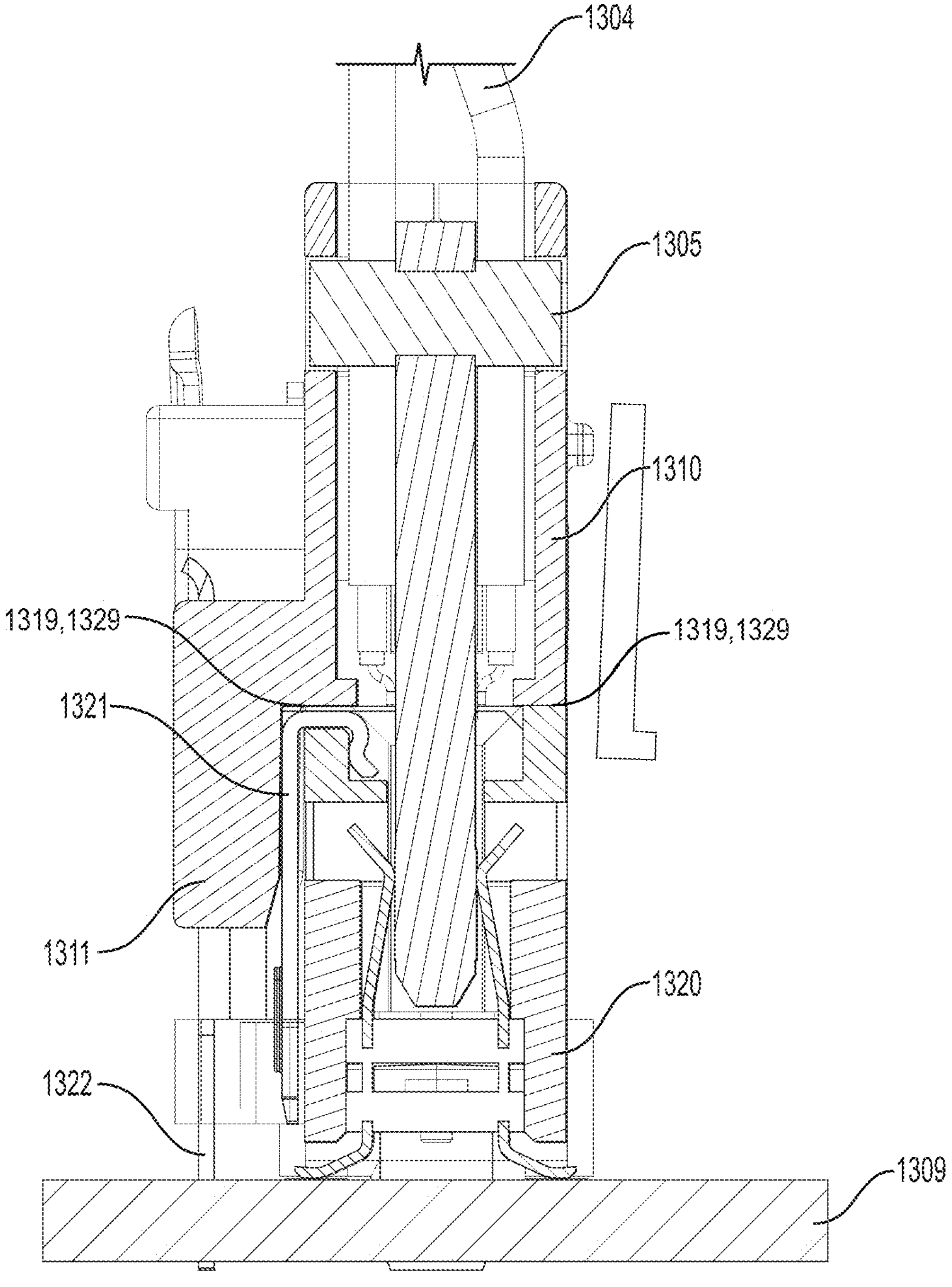
FIG. 13 shows a side cross-sectional view of a cable connector system.

FIG. 13 shows a side cross-sectional view of a cable connector system that includes a cable connector 1310 and a board connector 1320. The cable connector 1310 can also be a mezzanine, co-planar, or other type of non-transceiver connector and is not limited solely to a cable connector 1310. The cable connector 1310 including cables 1304 and a cable strain relief 1305 is mated to the board connector 1320 that is mounted to a substrate 1309. The cable connector 1310 can define, in a side end view, a L-shape, a Z-shape, or some other shape. FIG. 13 shows that an outer wall 1311, similar to outer wall 107 discussed above, of a body of the cable connector 1310 is cantilevered from the cable connector 1310 and extends beyond a mating face 1319 of the cable connector 1310 that mates with a mating face 1329 of the board connector 1320. As shown in FIG. 13, the mating face 1319 of the cable connector and the mating face 1329 of the board connector 1320 may be in direct physical contact. However, the mating face 1319 of the cable connector and the mating face 1329 of the board connector 1320 can instead be connected to each other by an intervening element, for example, a spacer or a gasket. In addition, the mating face 1319 of the cable connector and the mating face 1329 of the board connector 1320 can alternatively be adjacent to each other with a void spacing or air gap therebetween. The mating face 1319 of the cable connector 1310 can be parallel to the mating face 1329 of the board connector 1320 when the cable connector 1310 is mated with the board connector 1320. The cable connector 1310 can be self-supporting when mated to a mating connector, such as board connector 1320. The cable connector 1310 does not need to be supported by a cage or a printed circuit board or host substrate or a substrate when mated to a mating connector, such as board connector 1320.

An electrical connector, such as cable connector 1310, can include a first housing that defines the outer wall 1311 and the mating face 1319. The outer wall 1311 can extend beyond the mating face 1319. The electrical connector, such as cable connector 1310, can be configured to mate with a mating electrical connector, such as board connector 1320, in a mating direction that is perpendicular to a major plane of a host substrate or substrate 1309 that carries the mating electrical connector or board connector 1320. The outer wall 1311 can be only positioned on one side of the first housing. The electrical connector, such as cable connector 1310, can be devoid of other outer walls on other sides of the first housing that extend beyond the mating face 1319. Stated another way, the electrical connector, such as board connector 1320, can have an outer wall 1319, at least one outer wall 1319 or at least two outer walls 1319 positioned on only one side, and not have outer walls 1319 that each extend from the mating face 1319 on two or more sides of the first housing. The electrical connector can include an edge card (for example, edge card 1109 shown in FIG. 11). The electrical connector can include cables 1304. The electrical connector, such as cable connector 1310, can include a latch (for example, latch 1106 shown in FIG. 11). The latch 1106 can be positioned on one side of the first housing.

The cable connector 1310 can be devoid of an alignment pin or an alignment pin receptacle. The outer wall 1311 can be made from plastic, such as LCP. The outer wall 1311 can be part of the cable connector 1310 such that the outer wall 1311 and the housing of the cable connector 1310 can define a single-piece construction. The outer wall 1311 can be positioned parallel to the edge card 1109. The outer wall 1311 can define, in cross-section, two opposed parallel sides that are each longer than two opposed parallel end sides. The outer wall 1311 can extend along at least 25% of a length of the cable connector 1310. The outer wall 1311 can be positioned on only one side of the cable connector 1310, such as along one of the two opposed parallel sides. The outer wall 1311 can be positioned parallel or substantially parallel within manufacturing tolerances to cables 1304. A surface of the outer wall 1311 can be positioned parallel to a surface of the edge card (see, for example, edge card 1109 shown in FIG. 11). The surface of the outer wall 1311 can be spaced farther from the surface of the edge card 1109 than any other housing surface of the cable connector 1310 that is also positioned parallel to the surface of the edge card 1109. Stated another way, the outer wall 1311 can be offset from the rest of the housing of the cable connector 1310 such that a centerline passing through the outer wall 1311, parallel to a longitudinal centerline of the edge card 1109 or perpendicular to a longitudinal centerline of the strain relief 1305 or perpendicular to the mating face 1319, does not pass through any other portion of the housing of the cable connector 1310. The entire outer wall 1311 can be externally located with respect to the board connector 1320, when the cable connector 1310 is connected to the board connector 1320. No portion of the outer wall 1311 can intersect with any line connecting two opposed end walls of the board connector 1320. The outer wall 1311 can be structured so that it is not received into a body or a housing of the board connector 1320 or into any hole, void, recess, or cavity in the board connector 1320. The outer wall 1311 can be structured so that it does not extend into the board connector 1320, and instead extends adjacent to an external surface of the board connector 1320. For example, when the cable connector 1310 is mated with the board connector 1320, the outer wall 1311 can extend to cover an outer surface of a shield 1321 of the board connector 1320 so that the outer wall 1311 engages with the outer surface of the shield 1321 when cable or external forces are applied to cause the cable connector 1320 to rotate. As shown in FIG. 13, the outer surface of the shield 1321 is provided at an external surface of the board connector 1320. FIG. 13 also shows that a stake 1322, which is a portion of the shield 1321, extends from the shield 1321 and into a through hole in the substrate 1309. The stake 1322 provides mechanical rigidity and stabilization to the shield 1321 to significantly reduce or prevent deformation of the shield 1321. If forces from the cable or if external forces are applied to cause the cable connector 1320 to rotate, the outer wall 1311 and shield staking significantly reduces or prevents internal forces in the cable connector 1310 from causing the shield 1321 to deform or bend out and maintains engagement with the latch of the cable connector 1310. Accordingly, the outer wall 1311 and stake 1322 prevents dis-engagement of the latch mechanism and loss of signal continuity from the cables 1304 to traces on the substrate 1309. In this way, the cable connector 1310 stays latched to the board connector 1320 without a need for a connector position assurance (CPA) member.

It should be understood that the foregoing description is only illustrative of the present invention. Various alternatives and modifications can be devised by those skilled in the art without departing from the present invention. Accordingly, the present invention is intended to embrace all such alternatives, modifications, and variances that fall within the scope of the appended claims.

What is claimed is:

1. A cable connector including a housing with a mating surface, an outer wall that extends from the housing beyond the mating surface, an additional outer wall that extends from a same side of the housing as the outer wall, and a latch, wherein the outer wall is configured to cover a shield of a mating connector when the cable connector is mated with the mating connector, the outer wall is configured to be externally located with respect to the mating connector when the cable connector is mated with the mating connector, and the outer wall is on a same side of the housing as the latch.

2. The cable connector of claim 1, wherein the outer wall extends from only one side of the housing.

3. The cable connector of claim 1, wherein the outer wall extends from the mating surface.

4. The cable connector of claim 1, wherein the outer wall is plastic.

5. The cable connector of claim 1, further comprising a printed circuit board.

6. The cable connector of claim 5, wherein the printed circuit board extends farther from the mating surface than the outer wall.

7. The cable connector of claim 1, wherein the latch is located between the outer wall and the additional outer wall.

8. The cable connector of claim 1 that mates with a card edge connector.

* * * * *